US012775717B2

(12) United States Patent
Ast

(10) Patent No.: US 12,775,717 B2
(45) Date of Patent: Oct. 27, 2026

(54) METHOD FOR CONTROLLED RELEASE OF DECRYPTION KEY, DECRYPTION, AND DISTRIBUTION OF ENCRYPTED DIGITAL FILE VAULT BASED ON PREDEFINED TRIGGER EVENTS

(71) Applicant: Rodney Edward Ast, White Rock (CA)

(72) Inventor: Rodney Edward Ast, White Rock (CA)

( * ) Notice: Subject to any disclaimer, the term of this patent is extended or adjusted under 35 U.S.C. 154(b) by 189 days.

(21) Appl. No.: 18/920,860

(22) Filed: Oct. 19, 2024

(65) Prior Publication Data

US 2026/0111569 A1 Apr. 23, 2026

(51) Int. Cl.
*G06F 21/60* (2013.01)
*H04L 9/08* (2006.01)

(52) U.S. Cl.
CPC .......... *G06F 21/602* (2013.01); *H04L 9/0877* (2013.01); *H04L 9/0894* (2013.01)

(58) Field of Classification Search
None
See application file for complete search history.

(56) References Cited

U.S. PATENT DOCUMENTS 6,029,247 A * 2/2000 Ferguson ............ H04L 63/0823 726/5
7,966,242 B1 * 6/2011 Topitzer ................. G06Q 40/04 705/37
11,081,219 B1 * 8/2021 Dods ..................... G06N 3/0895
2022/0166621 A1 * 5/2022 Kairon ............... G06Q 20/3823
2024/0428357 A1 * 12/2024 Larsen ................. G06Q 30/018
2025/0348560 A1 * 11/2025 Blair ..................... G06F 21/106

FOREIGN PATENT DOCUMENTS

WO WO-0205061 A2 * 1/2002 ........... G06Q 20/367

* cited by examiner

*Primary Examiner* — Paul R Fisher

(57) ABSTRACT

A robust, future-proof method and system for securely encrypting and transferring digital data from a data owner to trusted digital data trustees, enabling decentralized storage and future decryption based on predefined trigger events set by the data owner, facilitated by a third-party server. This process includes the secure registration of the data owner on the third-party server, as well as the registration of selected trustees, their assigned roles, and the predefined trigger events linked to the encrypted data. The third-party server manages the assignment of trustee roles for the distribution and decentralized storage of the encrypted data, ensures trustee collaboration for unanimous validation of the trigger event before decryption, and enables the designated trustees to decrypt the data after the event is confirmed. Additionally, the server facilitates trustee interaction with the data owner's encryption settings to enable event-triggered decryption when the specified conditions occur.

17 Claims, No Drawings

METHOD FOR CONTROLLED RELEASE OF DECRYPTION KEY, DECRYPTION, AND DISTRIBUTION OF ENCRYPTED DIGITAL FILE VAULT BASED ON PREDEFINED TRIGGER EVENTS

FIELD OF THE INVENTION

The present invention relates to the fields of cryptography, secure data sharing, and digital storage. Specifically, it involves a method and system for securely encrypting, transferring, and storing digital data with controlled decryption based on predefined events or circumstances (trigger events). The invention addresses the challenge of allowing digital data owners to share their private, sensitive, or confidential data with trusted contacts (digital data trustees) without those trustees having access unless a specified event occurs.

BACKGROUND OF THE INVENTION

In today's digital age, many individuals and organizations store sensitive data electronically, often encrypted to protect it from unauthorized access. However, a significant challenge arises when a data owner wishes to share this data with designated trustees for future use, without immediate access, and based on certain trigger events such as the owner's death, incapacitation, or other conditions.

Existing systems typically either provide immediate access to trustees upon sharing or rely on manual processes for event verification, which can introduce vulnerabilities or inefficiencies. Furthermore, traditional methods often lack decentralized storage mechanisms, making the system prone to single points of failure.

The need exists for a secure, future-proof method that allows digital data owners to conditionally release encrypted data only upon the occurrence of predefined events. The present invention addresses these needs by enabling encrypted data to be stored and shared securely, with decryption triggered by predefined events.

The above information disclosed in this background section is only for enhancement of understanding of the background of the inventive concept, and, therefore, it may contain information that does not form the prior art that is already known to a person of ordinary skill in the art.

SUMMARY OF THE INVENTION

The present invention provides a method and system for the controlled release of decryption keys, decryption, and distribution of encrypted digital data vaults, triggered by predefined circumstances or events (trigger events) set by the data owner. The system is facilitated by a third-party server that manages the secure registration of the data owner and trustees, encryption and decentralized storage of data, and validation of trigger events for future decryption.

Key features of the invention are:

a. Registration of Data Owners and Trustees: Secure registration of the data owner and trusted contacts (digital data trustees) on a third-party server, with role assignments to manage storage and decryption.

b. Decentralized Storage: Encrypted data is stored in a decentralized manner across multiple storage nodes, reducing risks of compromise through a single point of failure.

c. Collaborative Validation of Trigger Events: A key feature is the collaborative validation by trustees, ensuring that no single trustee can access the data without unanimous agreement. Trustees must collaboratively validate the occurrence of the predefined trigger event before the decryption key is released.

d. Time Delay Before Decryption (Optional): The data owner may set an optional time delay between event validation and decryption key release for additional security or review purposes.

DETAILED DESCRIPTION OF THE INVENTION

In the following description, for the purposes of explanation, numerous specific details are set forth to provide a thorough understanding of various exemplary embodiments. It is apparent, however, that various exemplary embodiments may be practiced without these specific details or with one or more equivalent arrangements.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

The present invention provides a computer implemented method for the controlled release of decryption keys, decryption, and distribution of encrypted digital data vaults, triggered by predefined circumstances or events (trigger events) set by the data owner. The system is facilitated by a third-party server that manages the secure registration of the data owner and trustees, encryption and decentralized storage of data, and validation of trigger events for future decryption. A key feature is the collaborative validation by trustees, ensuring that no single trustee can access the data without unanimous agreement.

Registration and Assignment of Roles: The first step involves secure registration of the data owner on a third-party server. The owner uploads the digital data to be protected and selects trusted contacts (digital data trustees). These trustees are assigned predefined roles, including:

Trust Circle (Validation Trustee): Responsible for initiating the process by requesting to open the vault after confirming the occurrence of a predefined trigger event.

File Holders (Storage Trustee): Trustees who hold encrypted copies of the digital data.

Key Holders (Decryption Trustee): Trustees who receive the decryption key after the vault has been opened by the trust circle trustees.

Encryption and Decentralized Storage: Once the data is uploaded, it is encrypted using a cryptographic algorithm, such as AES-256, and stored as a digital data set. The encrypted data is distributed to the file holders (trustees) or stored on decentralized nodes to ensure its security. The encryption key generated for this process is encrypted by a key management system and securely stored on a third-party server external key management system.

Defining Predefined Trigger Events: The data owner specifies one or more trigger events that will initiate the decryption process. These events may include:

a. The death or incapacitation of the owner.

b. Accidents, emergencies or disasters.

c. A specific future date or milestone.

The third-party server records the event, associated instructions, and roles of trustees involved in the process.

Collaborative Validation of Trigger Event: Upon the occurrence of the trigger event, the trust circle trustees each log in to the third-party server and independently request to open the vault, providing confirmation of the event. The system requires unanimous validation from all trust circle trustees before the event vault can be opened. If any trustee disagrees or does not respond, the vault remains closed.

Decryption Key Release and Optional Time Delay: Once unanimous agreement is reached, the decryption key is released to the key holders. If the data owner has enabled the optional time delay, the release of the decryption key will be delayed for a predefined period, allowing additional control or time for review.

During the time delay, the owner (if alive) can review the vault contents before the key holders gain access. If the owner is satisfied, the vault remains unlocked; otherwise, the owner can relock it.

Decryption of the Data: Upon release of the decryption key, the key holders decrypt the digital data set, allowing access to the original data. The third-party server verifies the decryption key with the external key management system before granting access to the decrypted data.

An embodiment of the invention discloses a method that comprises the steps of:

a. registration of owner of digital data on a third-party server;
b. registration of data trustees selected by the owner;
c. dividing the trustees into groups and assigning them predefined roles to be performed in event of occurrence of a trigger-event;
d. encryption of digital data into digital data set and creation of a digital event vault, followed by delivery of digital data set to a group of trustees,
e. registration of the predefined trigger-event for future decryption of the digital data set;
f. generation of a decryption key by the third-party server for the encryption and decryption of the event vault digital data set;
g. encryption of the event vault decryption key in a key management system on another or external third-party server;
h. storing the encrypted decryption key, of the event vault digital data set, in a key management system on another or external third-party server;
i. deletion of the digital data and digital data set from the third-party server;
j. receiving a request to open the vault from a first group of trustees, after the occurrence of the trigger-event, wherein each trustee makes an independent request to open the vault to make a collaborative validation of the occurrence of the trigger-event;
k. release of the encrypted decryption key, of the event vault digital data set, to a third group of trustees, followed by decryption of the encrypted data by using the decryption key.

There is a decentralized storage of digital data set, and the digital data is temporarily stored on the third-party server for encryption, decryption and distribution.

The invention discloses a secure registration of the data owner and trusted contacts (digital data trustees) on a third-party server, with role assignments to manage storage and decryption. The registration of the owner comprises registering an account followed by the creation of a unique user account, on the third-party server.

The registration of the data trustees comprises adding the trustees as contacts in an address book. The selected trustees are sent email invitations prompting them to register themselves. The trustees then complete their registration, and their accounts are created on the third-party server. The presence and activation of the owner's address book on the third-party server reflects the successful registration of each trustee.

The predefined roles may comprise trust circle role, file holder role, and key holder role. There may be more types and categories of the roles. Each role is assigned to a different group of the trustees. Each group of the trustees may comprise one or more trustees and each trustee may be assigned a single role or multiple roles.

The first group of trustees, assigned with the role of trust circle, is responsible to submit a request to open the vault after validation that the trigger event has occurred, and wherein each trustee of the group submits an independent request to open the vault.

The second group of trustees assigned with the role of file holders, receives the encrypted digital data set delivered to them at the time of event vault creation on the third-party server.

The third group of trustees, assigned with the role of key holders, receives the decryption key, released after the vault has been opened by the trust circle trustees, to decrypt the digital data set.

The digital event vault is created by the owner on the third-party server and comprises event definition and instructions. The event definition defines the potential future trigger event or condition under which the vault is to be opened by the trustees. The instructions are specified by the owner and are to be followed by the trustees if the trigger event occurs.

The event vault is processed by the third-party server by a method comprising:

a. event vault record creation, wherein the third-party server creates and stores records for the event vault, including the event vault name, universally unique identifier, trigger event instructions, file names of digital data and digital data set, details of trustees' accounts and their assigned roles, time delay parameter;
b. encryption and distribution, wherein the third-party server generates a decryption key and encrypts the digital data with the key into the digital data set using a cryptographic algorithm;
c. encryption of the decryption key by the key management system of the another or external third-party server, and storage of the encrypted decryption key in the key management system of the another or external third-party server; distribution of the encrypted digital data set to the owner and the file holders;
d. deletion of the original and the encrypted digital data set from the third-party server followed by overwriting of its space with random data to ensure that the deleted files are completely unrecoverable.

The distribution of the digital data set may take place in multiple ways. The digital data set is distributed through email when it contains a single file with unique file extension and its size is below the predetermined email capacity limit. When the digital data set contains multiple files and the total size is below the predetermined email capacity limit, the files are compressed into a single zip file and distributed through email. If the digital data set contains a single file that exceeds the predetermined email capacity limit, a download link of the file is generated by the third-party server and sent through email. If the digital data set contains multiple files and the total size exceeds the predetermined email capacity limit, the files are compressed into a zip file and a download link is generated by the third-party server and sent through email.

When there is the occurrence of the trigger event, the event vault is opened through a method wherein, first, the trustee of the trust circle logs onto his user account on the third-party server, submits request to open the vault and provides details of the trigger event to be shared with the owner and all other trustees. The owner and all the trustees are notified by the third-party server through an email that an open request has been made by the trust circle trustee along with the details of the trigger event. Each trust circle trustee independently validates and agrees to the occurrence of the trigger event and the event vault is opened once all the trust circle trustees have submitted their requests to open it. In case the owner wants to only review the event vault, the whole method to open the vault is done in the same collaborative manner requiring all the trust circle trustees to make open vault requests as if the trigger event has occurred, and after reviewing, the owner relocks the vault.

The invention may further comprise an addition function of setting a time delay for the release of the decryption key to the key holders after the vault has been opened. The time delay has two effects on the decryption of the digital data set:

a. once all the trust circle members have made requests to open the vault, the time delay countdown starts before any key holder member has access to the decryption key;
b. the owner, during the time delay, has access to the decryption key allowing him the decryption of the event vault for a review.

The decryption of the digital data set takes place by inputting the decryption key by the key holder trustees or the owner, after the third-party server has opened the vault. The third-party server, after validation of the decryption key with the key management system of another third-party server, decrypts the encrypted decryption key and the digital data set and allows for the original digital data to be downloaded and saved to a digital storage device by the key holder trustees or the owner.

An embodiment of the invention discloses a method comprising the following steps:

a. Account Registration and Setup on Third Party Server (3PS)
b. Creation of Event Vault (EV) on 3PS
c. Processing of Event Vault by 3PS
d. Event Vault Unlocking on 3PS
e. Decryption of Unlocked Event Vault on 3PS Account Registration and Setup on Third Party Server (3PS):

1) Data Owner (DO) Registration:
   a) The Data Owner (DO) registers an account on the Third-Party Server (3PS).
   b) The 3PS creates a unique user account for the DO.
2) Data Trustees (DTTES) Setup:
   a) The DO adds Data Trustees (DTTES) as contacts in their 3PS Address Book.
   b) The 3PS sends email invitations to the selected DTTES, prompting them to register.
   c) DTTES complete their registration on the 3PS, and accounts are created for them.

The DO's Address Book on 3PS reflects the successful registration of each DTTES.

Creation of Event Vault (EV) on 3PS:

1) Initiation of Event Vault:
   a) The DO initiates the creation of an Event Vault (EV) on the 3PS.
   b) An EV comprises the following components:
   Event Definition: The DO defines a potential future Trigger Event (TE) or condition under which the vault should be opened by DTTES.
   Instructions: The DO specifies instructions for the DTTES if the event occurs.
2) Digital Data Set (DDS): The DO uploads and encrypts Digital Data (DD) to be securely stored in the EV.
3) Trustee Roles: The DO assigns specific roles to DTTES involved in the EV.
   a) At least one DTTES must be assigned to each role, and a DTTES can hold multiple roles.
   b) The DO assigns the following roles to DTTES:
      i) Trust Circle (DTTES-TC): DTTES-TC members must unanimously agree that the event has occurred by submitting Open Vault Requests (OVR) to the 3PS, triggering the vault's opening.
      ii) File Holders (DTTES-F): DTTES-F members receive the encrypted DDS via email attachment or email download link once the EV is processed by 3PS.
      iii)Key Holders (DTTES-K): DTTES-K members are entrusted with the decryption key, which is released after all DTTES-TC have made their OVRs and the vault is opened.
      iv)The DO can set an optional time delay for key release to DTTES-K after the vault is unlocked.
4) Digital Data Management: The DO performs the following actions to manage the Digital Data (DD):
   a) Attachment of Digital Data: The DO attaches the DD to the EV.
   b) File Naming: The DO assigns a file name to the DD before uploading it to the 3PS for processing.

Processing of Event Vault by 3PS:

1) Event Vault Record Creation:
   a) The 3PS creates and stores records for the EV, including EV name, TE instructions, DD & DDS file names, details of DTTES accounts and their assigned roles.
   b) The DO's Digital Data (DD) is temporarily stored on the 3PS.
2) Encryption and Distribution:
   a) The 3PS encrypts the DD into a Digital Data Set (DDS) using a cryptographic algorithm.
   b) The 3PS generates two encryption keys:
      i) Public Key: Stored within the EV record on the 3PS.
      ii) Private Key: Stored separately in a Key Management System (KMS) with a different 3PS.
   c) The DDS is then distributed to DTTES-F and DO according to the following scenarios:
      i) Scenario 1: Single File, Under Predetermined Size Limit: If the DDS contains a single file and its size is below the predetermined email capacity limit:
         (a) The file is directly distributed to the DTTES-F and the DO via email.
         (b) The file is sent with unique file extension to signify its encrypted state.
      ii) Scenario 2: Multiple Files, Under Predetermined Size Limit: If the DDS contains multiple files and the total size is below the predetermined email capacity limit:
         (a) The files are compressed into a single .zip file.
         (b) The .zip file is then sent to the DTTES-F and the DO via email.

iii) Scenario 3: Single File, Over Predetermined Size Limit: If the DDS contains a single file that exceeds the predetermined email capacity limit:

(a) A download link is generated by the 3PS.

(b) The DTTES-F and the DO are sent an email containing this download link, which leads to the file with unique file extension to signify its encrypted state.

(c) This allows the DTTES-F and the DO to securely download the encrypted file directly from the 3PS server.

iv) Scenario 4: Multiple Files, Over Predetermined Size Limit: If the DDS contains multiple files and the total size exceeds the predetermined email capacity limit:

(a) The files are compressed into a .zip file.

(b) A download link is generated by the 3PS.

(c) The DTTES-F and the DO receive an email with the download link, enabling them to securely download the .zip file from the 3PS server.

(d) The 3PS ensures that the original temporary DO DD and the distributed DDS files to DTTES's and the DO by email are deleted from its server and the file space is then overwritten multiple times with random data to ensure that the temporarily stored files are completely unrecoverable.

3) Post-Processing Data Deletion: The 3PS ensures that all DDS files distributed by email download link, remain encrypted and secure until accessed by authorized DTTES and/or DO. After DTTES and/or DO have accessed and downloaded DDS, the 3PS deletes the temporary download links and DDS files from its server and the file space is then overwritten multiple times with random data to ensure that the temporarily stored files are completely unrecoverable.

Event Vault Unlocking on 3PS:

1) DTES-TC learns of an occurrence of DO TE as defined by DO in an EV:

a) DTTES-TC logs onto their user account on 3PS.

b) DTTES-TC selects DO EV that is associated to TE and requests said EV to be unlocked/opened (OVR) and provides details on 3PS of TE to share with other DTTES-TC's and DTTES.

c) All DTTES and DO are notified by 3PS in an email that a OVR was made by the DTTES-TC and the details of the TE.

d) DO at any time can reset status of EV to clear DTTES-TC OVR's, resetting the EV to locked with no OVR's being indicated from DTTES-TC's.

e) Step 1) is repeated by other DTTES-TC if they independently validate and agree that the DO EV TE did indeed occur, until all DTTES-TC unanimously agree and make OVR's and the EV status is changed to unlocked/open on 3PS.

f) Once all DO EV DTTES-TC have all made OVR's and EV is unlocked, if DO EV has optional Time Delay time parameter entered; this has two affects on ability to decrypt EV:

i) Once the final DTTES-TC has made OVR the Time Delay countdown starts before any DTTES-K has access to decryption key to decrypt EV.

ii) DO during the EV Time Delay has access to decryption key to decrypt EV for review.

2) DO unlocking/opening of EV for their own review, must utilize DTTES-TC's in the same way DTTES as if a DO EV TE occurred in as Step 1—this is accomplished by DO using 3PS to send message/email to DTTES that they are requesting DTTES-TC make OVR's for the EV, so that DO can unlock/open EV for their review:

a) Prior to DO sending 3PS message/email to DTTES, the DO should ensure that a Time Delay exists or edit the EV to enter Time Delay parameters that lockout DTTES-K from being able to receive decryption key needed to decrypt EV and only DO having access to the decryption key to be able to decrypt EV during this time.

b) After EV review by DO, the DO can then reset lock on 3PS for EV back to locked to prevent unwarranted DTTES access to EV, as the EV opening was for DO review, not due to EV TE occurring.

Decryption of Unlocked Event Vault on 3PS:

1) Once all DTTES-TC have made OVR's on 3PS and EV lock status is changed to Unlocked, then DTTES-K and/or DO can decrypt DDS on 3PS-DDTES subject to any DO set Time Delay:

a) DTTES-TC and/or DO selects EV DDS to upload into 3PS Decrypt function.

b) DTTES-TC and/or DO selects Decryption Key Lookup Tool Key Lookup Tool and the 3PS validates:

i. EV is Unlocked.

ii. Registered user is a DTTES or DO of that specific EV.

iii. Registered user is a DTTES-K for that specific EV and has permission for decryption for that EV.

iv. Any Time Delay set by DO for Decryption Key has elapsed for DTTES-K.

v. Confirmation that the Public Key in EV matches Private Encryption Key in Key Management System.

2) If all conditions satisfied in 1) b) then Decryption Key is populated into Decrypt function for DTTES-K or DO automatically.

3) DTTES-K or DO then sends EV DDS, Public Decryption Key and credentials to 3PS for processing and interaction with another 3PS acting as Key Management System.

3PS decrypts DDS and returns DD file(s) with original file name and extension retrieved from EV record to device for DTTES-K or DO to save.

Another embodiment of the invention further comprises a method to send encrypted attachments by email, wherein:

1) Registered user on 3PS can send email with encrypted attachment through 3PS to non-registered 3PS recipient(s), 2) Sender has option to set Date and Time of when Decryption Key can be released for attachment decryption through 3PS (this may be used for Press Releases, Birthday Card, Public Financial Information Disclosures, etc.), 3) Recipient(s) then must register and create account on 3PS to use Decryption Engine.

Advantages of the Invention:

a. Event-Triggered Release of Sensitive & Critical Information: In times of life events and emergencies, ensuring that essential information reaches the right people at the right time is crucial. With this invention, sensitive information is securely managed and released precisely when needed.

b. Collaborative Security and Validation: Multiple trustees must independently confirm the occurrence of the trigger event, ensuring no premature access to sensitive data. The system employs collaborative security measures and validation of trigger occurrences. This ensures that the release of information is verified and authenticated by multiple trusted sources, providing an additional layer of security.

c. Decentralized Storage: The invention provides a decentralized trustee storage model, distributing encrypted vault contents to trustees. This approach enhances security in that secure locations are trustee selected, unknown by the 3PS and not centralized with other data or industry-standard could storage design.

d. Optional Time Delay: Offers extra control, allowing the owner to review or cancel the decryption after validation of the event.

e. Resilient Against Multiple Account Compromises: The system is designed to handle scenarios where multiple user accounts may be compromised. Even in such cases, the integrity and confidentiality of the encrypted vault and its contents remain intact, safeguarding critical information.

f. Flexibility: The system can adapt to various types of trigger events, legal requirements, and future scenarios.

This invention offers a secure, future-proof method for controlled encryption, storage, and conditional decryption of sensitive digital data based on predefined trigger events. By utilizing decentralized storage, collaborative validation, and optional time delays, the system provides a high level of security and flexibility to digital data owners and trustees.

What is claimed is:

1. A computer implemented method for controlled encryption, decryption and release of digital data, the method comprising:

registering an owner of the digital data on a third-party server;

registering the data trustees selected by the owner;

dividing the trustees into groups and assigning them predefined roles to be performed in event of occurrence of a trigger-event;

encrypting of the digital data into a digital data set and creating of a digital event vault, followed by delivery of the digital data set to a second group, of trustees;

registering of the predefined trigger-event for future decryption of the digital data set;

generating a decryption key by the third-party server for the encryption and decryption of the event vault digital data set;

encrypting the event vault decryption key by a key management system on another or external third-party server;

storing the encrypted decryption key, of the event vault digital data set, in a key management system on the another or external third-party server;

deleting the digital data and the digital data set from the third-party server;

receiving a request to open the vault from a first group of trustees, after the occurrence of the trigger-event, wherein each trustee makes an independent request to open the vault to make a collaborative validation of the occurrence of the trigger-event; and releasing the encrypted decryption key, of the event vault digital data set, to a third group of trustees, followed by decrypting the encrypted data by using the decryption key;

wherein there is decentralized storage of the digital data set, and the digital data is temporarily stored on the third-party server for encryption, decryption and distribution.

2. The method of claim 1, wherein registering the owner comprises registering an account followed by the creation of a unique user account, on the third-party server.

3. The method of claim 1, wherein registering the data trustees comprises: adding the trustees as contacts in an address book; sending email invitations to the selected trustees and prompting them to register; and completing the registration by the trustees and creating their accounts on the third-party server; wherein the owner's address book on the third-party server reflects the successful registration of each trustee.

4. The method of claim 1, wherein the predefined roles comprise trust circle, file holder, and key holder, each assigned to a different group of the trustees; wherein the first group of trustees, assigned with the role of trust circle, is responsible to submit a request to open the vault after validation that the trigger event has occurred, and wherein each trustee of the group submits an independent request to open the vault; wherein the second group of trustees assigned with the role of file holders, receives the encrypted digital data set delivered to them at the time of event vault creation on the third-party server; wherein the third group of trustees, assigned with the role of key holders, receives the decryption key, released after the vault has been opened by the trust circle trustees, to decrypt the digital data set.

5. The method of claim 1, wherein each group of the trustees comprises one or more trustees and each trustee can be assigned a single or multiple roles.

6. The method of claim 1, wherein the digital event vault is created by the owner on the third-party server and comprises: event definition, that defines the potential future trigger event or condition under which the vault is to be opened by the trustees; and, instructions, specified by the owner, to be followed by the trustees if the trigger event occurs.

7. The method of claim 1, wherein the event vault is processed by the third-party server by a method comprising: event vault record creation, wherein the third-party server creates and stores records for the event vault, including the event vault name, universally unique identifier, trigger event instructions, file names of digital data and digital data set, details of trustees' accounts and their assigned roles, time delay parameter, and the encrypted decryption key; encryption and distribution, wherein the third-party server generates a decryption key and encrypts the digital data with the decryption key into the digital data set using a cryptographic algorithm; encryption of the decryption key by the key management system of the another or external third-party server, and storage of the encrypted decryption key in the key management system of the another or external third-party server; distribution of the encrypted digital data set to the owner and the file holders; and, deletion of the original and the encrypted digital data set from the third-party server followed by overwriting of its space with random data to ensure that the deleted files are completely unrecoverable.

8. The method of claim 7, wherein the digital data set is distributed through email when it contains a single file with unique file extension and its size is below the predetermined email capacity limit.

9. The method of claim 7, wherein if the digital data set contains multiple files and the total size is below the predetermined email capacity limit, the files are compressed into a single zip file and distributed through email.

10. The method of claim 7, wherein if the digital data set contains a single file that exceeds the predetermined email capacity limit, a download link of the file is generated by the third-party server and sent through email.

11. The method of claim 7, wherein if the digital data set contains multiple files and the total size exceeds the predetermined email capacity limit, the files are compressed into a zip file and a download link is generated by the third-party server and sent through email.

12. The method of claim 1, wherein the event vault is opened, after the occurrence of the trigger event, through a method comprising: the trustee of the trust circle logs onto his user account on the third-party server, submits request to open the vault and provides details of the trigger event to be shared with the owner and all other trustees; the owner and all the trustees are notified by the third-party server through an email that an open request is made by the trust circle trustee along with the details of the trigger event; each trust circle trustee independently validates and agrees to the occurrence of the trigger event; and the event vault is opened once all the trust circle trustees have submitted their requests to open it.

13. The method of claim 1, further comprising setting a time delay for the release of the decryption key to the key holders after the vault has been opened.

14. The method of claim 13, wherein the time delay has two effects on the decryption of the digital data set: once all the trust circle members have made requests to open the vault, the time delay countdown starts before any key holder member has access to the decryption key; the owner, during the time delay, has access to the decryption key allowing him the decryption of the event vault for a review.

15. The method of claim 12, wherein, to only review the event vault by the owner, the whole method to open the vault is done in the same collaborative manner requiring all the trust circle trustees to make open vault requests as if the trigger event has occurred, and after reviewing, the owner relocks the vault.

16. The method of claim 1, wherein decrypting the digital data set takes place by inputting the decryption key by the key holder trustees or the owner, after the third-party server has opened the vault; and the third-party server, after validating the decryption key with the key management system of the another or external third-party server, decrypting the encrypted decryption key and the digital data set and allows for the original digital data to be downloaded and saved to a digital storage device by the key holder trustees or the owner.

17. The method of claim 1, further comprising a method to send encrypted attachments by email: wherein registered user on the third-party server can send email with encrypted attachment through the third-party server to a non-registered third party server recipient; wherein the user has an option to set date and time when the decryption key can be released for attachment decryption through the third-party server; and wherein the recipient then registers and creates an account on the third-party server to use decryption engine.

* * * * *